(12) United States Patent
Okuhata et al.

(10) Patent No.: US 11,926,480 B2
(45) Date of Patent: Mar. 12, 2024

(54) CONTAINER PROCESSING SYSTEM

(71) Applicant: SHIBUYA CORPORATION, Kanazawa (JP)

(72) Inventors: Shun Okuhata, Kanazawa (JP); Masaharu Kawahara, Kanazawa (JP); Koji Kaya, Kanazawa (JP)

(73) Assignee: SHIBUYA CORPORATION, Kanazawa (JP)

( * ) Notice: Subject to any disclaimer, the term of this patent is extended or adjusted under 35 U.S.C. 154(b) by 0 days.

(21) Appl. No.: 17/935,288

(22) Filed: Sep. 26, 2022

(65) Prior Publication Data
US 2023/0111394 A1   Apr. 13, 2023

(30) Foreign Application Priority Data
Sep. 30, 2021   (JP) .................................. 2021-161965

(51) Int. Cl.
*B65G 33/04*  (2006.01)
*B65G 47/84*  (2006.01)

(52) U.S. Cl.
CPC ........... *B65G 33/04* (2013.01); *B65G 47/846* (2013.01); *B65G 2201/0244* (2013.01)

(58) Field of Classification Search
CPC ...... B65G 33/04; B65G 33/06; B65G 47/846; B65G 47/847; B65G 47/848; B65G 2201/0244
See application file for complete search history.

(56) References Cited

U.S. PATENT DOCUMENTS

| | | | | |
|---|---|---|---|---|
| 4,660,708 A | * | 4/1987 | Willerding | B67C 7/0013 198/341.02 |
| 7,284,577 B2 | * | 10/2007 | Yoneda | B65G 47/28 141/144 |
| 8,490,778 B2 | * | 7/2013 | Wolf | B65G 33/04 198/459.4 |
| 10,059,528 B2 | * | 8/2018 | Timmins | B65G 47/30 |
| 2012/0175224 A1 | * | 7/2012 | Briggs | B65G 47/846 198/478.1 |

FOREIGN PATENT DOCUMENTS

JP    2013-230836 A    11/2013

* cited by examiner

*Primary Examiner* — Mark A Deuble
(74) *Attorney, Agent, or Firm* — FLYNN THIEL, P.C.

(57) ABSTRACT

A container supplying apparatus includes a supply conveyer conveying containers and a screw engaging with the containers on the supply conveyer and conveying the containers to a downstream side. The screw is divided into an upstream screw and a downstream screw rotationally driven by different servomotors. In a case where no container is supplied to a specific bottle table of a weighing and filling apparatus, the upstream screw is decelerated and is then accelerated relative to the downstream screw. As a result, an interval of the successive containers is expanded, and a large interval is maintained therebetween. This supplies no container to the specific bottle table of the weighing and filling apparatus.

1 Claim, 5 Drawing Sheets

CONTAINER PROCESSING SYSTEM

FIELD OF THE INVENTION

The present invention relates to a container processing system, and more specifically to a container processing system that includes a plurality of container supporting devices and is configured so as to not supply a container to a specific container supporting device among the plurality of container supporting devices.

DESCRIPTION OF THE RELATED ART

For example, as disclosed in Japanese Patent Laid-Open No. 2013-230836, a rotary weighing and filling apparatus includes: a plurality of container supporting devices provided at equal intervals in a circumferential direction on an outer peripheral portion of a rotor; a plurality of filling devices provided above the respective container supporting devices and configured to fill the containers supported by the container supporting devices with liquid; a weighing device configured to weigh filling liquid discharged into the containers through the filling devices; and a control device configured to control opening/closing of the filling devices based on signals from the weighing device, has been widely known.

In a container processing apparatus such as the rotary weighing and filling apparatus, the containers to be processed are conveyed by a supply conveyer and are separated from one another at predetermined intervals by a screw, and are then delivered to a supply wheel. The containers rotationally conveyed while being held by the supply wheel are each delivered to the container supporting devices of the rotor at a container supply position.

For example, in a case where a defect occurs on any of filling nozzles and load cells in the rotary weighing and filling apparatus, the production is generally continued without performing filling by the corresponding filling nozzle. In this method, the container is supplied to the container supply device corresponding to the filling nozzle not performing filling, and the container is rejected as a defective container at a downstream position.

In this case, at least one container is rejected every time the weighing and filling apparatus is rotated once. Therefore, the number of containers rejected at the downstream position is increased, and a large space to house the rejected containers is necessary. In addition, the container may be damaged when rejected, which increases possibility of wasteful containers.

SUMMARY OF THE INVENTION

In consideration of the above-described circumstances, according to the present invention, a container processing system includes: a plurality of container supporting devices on a rotor provided at predetermined pitches along an outer peripheral portion of the rotor, and configured to support containers; a plurality of processing mechanisms provided on the rotor, corresponding to the respective container supporting devices, and configured to perform predetermined processing on the containers supported by the container supporting devices; a container supply apparatus configured to supply the containers to the container supporting devices of the rotor; and a control apparatus configured to control operation of the plurality of processing mechanisms and the container supply apparatus, the container supply apparatus including a supply conveyer and a screw, the supply conveyer being configured to convey the containers, and the screw being configured to convey the containers on the supply conveyer to a downstream side by causing a spiral groove provided on an outer peripheral surface to engage with the containers. The container processing system is characterized in that the screw includes a downstream screw and an upstream screw, the downstream screw is disposed on a downstream side in a conveyance direction and is rotated by a first driving mechanism, the upstream screw is disposed on an upstream side in the conveyance direction and is rotated by a second driving mechanism, operation of the first driving mechanism and the second driving mechanism being controlled by the control apparatus, in a case where the containers are supplied to all of the container supporting devices of the container processing apparatus, while the rotor is rotated, the downstream screw and the upstream screw are rotated at the same speed, and the containers are conveyed to the downstream side by being caused to engage with a spiral groove provided on outer peripheral surfaces of both the downstream screw and the upstream screw. In a case where no container is supplied to a specific container supporting device of the container processing apparatus, while the rotor is rotated once, an interval of successive containers engaging with the spiral groove is expanded by decreasing and then increasing the speed of the upstream screw at least once relative to the downstream screw, to supply no container to the specific container supporting device.

According to such a configuration, among the plurality of container supporting devices provided in the container processing apparatus, it is possible to supply no container to the specific container supporting device and to supply the containers to the other container supporting devices.

DETAILED DESCRIPTION OF THE PREFERRED EMBODIMENT

Figure 1:
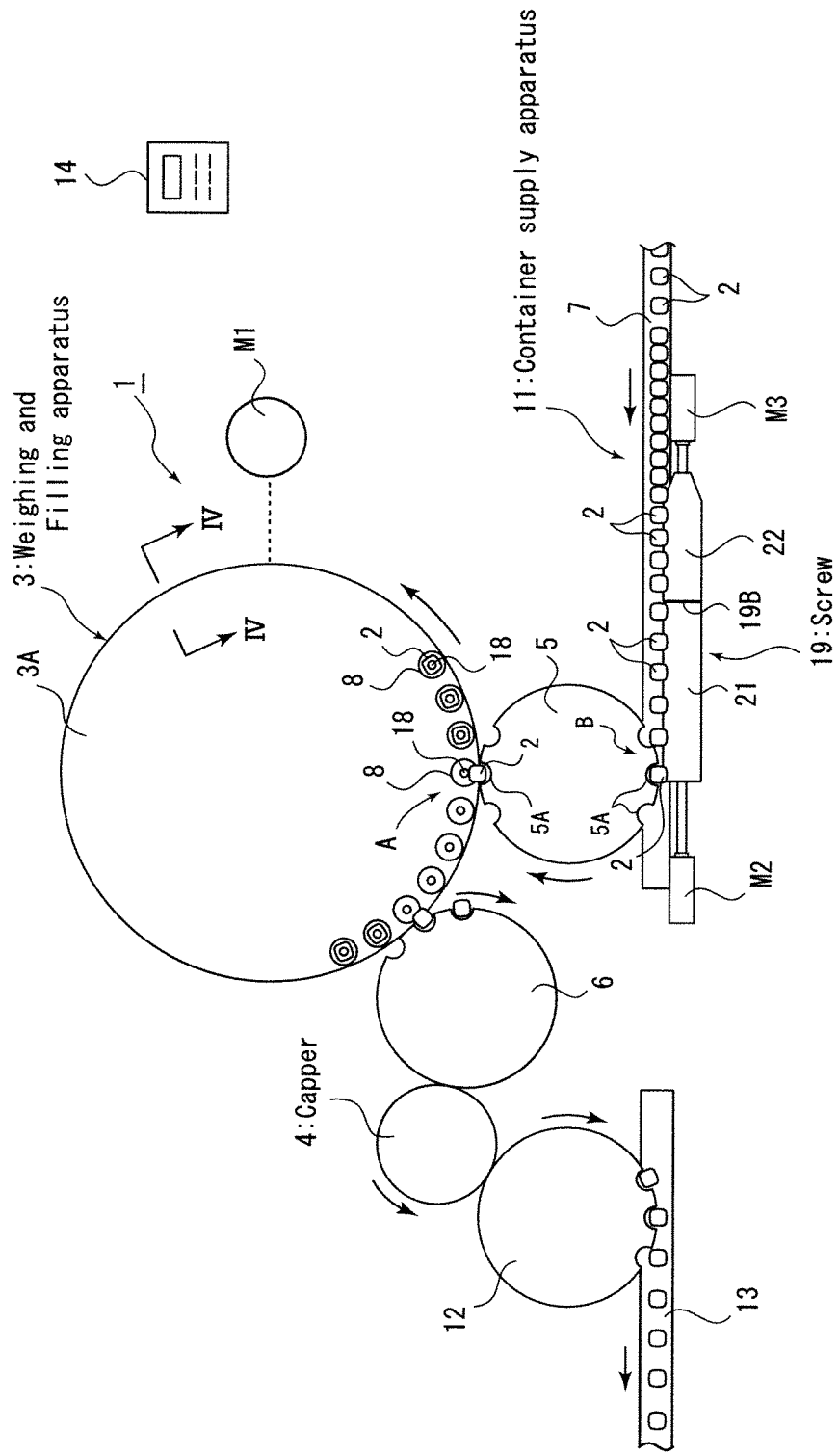
FIG. 1 is a plan view illustrating an embodiment of the present invention.

An illustrated embodiment of the present invention is described below. In FIG. 1, reference numeral 1 denotes a container processing system. In the container processing system 1, a rotary weighing and filling apparatus 3 fills each of a large number of containers 2 with a predetermined weight of filling liquid while the containers 2 are conveyed in a straight line, and then a rotary capper 4 caps upper end openings of the containers 2.

The container processing system 1 includes the weighing and filling apparatus 3 as a container processing apparatus filling each of the containers 2 with the predetermined weight of filling liquid, a supply wheel 5 and an intermediate wheel 6 respectively disposed at an adjacent upstream position and an adjacent downstream position of the weighing and filling apparatus 3, a container supply apparatus 11 that is disposed at an adjacent upstream position of the supply wheel 5 and supplies the containers 2 on a supply conveyer 7 to respective bottle tables 8 of the weighing and filling apparatus 3 through the supply wheel 5, the capper 4 that is disposed at an adjacent downstream position of the intermediate wheel 6 and caps the upper end openings of the containers 2, a discharge wheel 12 disposed at an adjacent downstream position of the capper 4, a discharge conveyer 13 conveying the processed containers 2 delivered from the discharge wheel 12, to a downstream side, and a control apparatus 14 controlling operation of these components.

Figure 4:
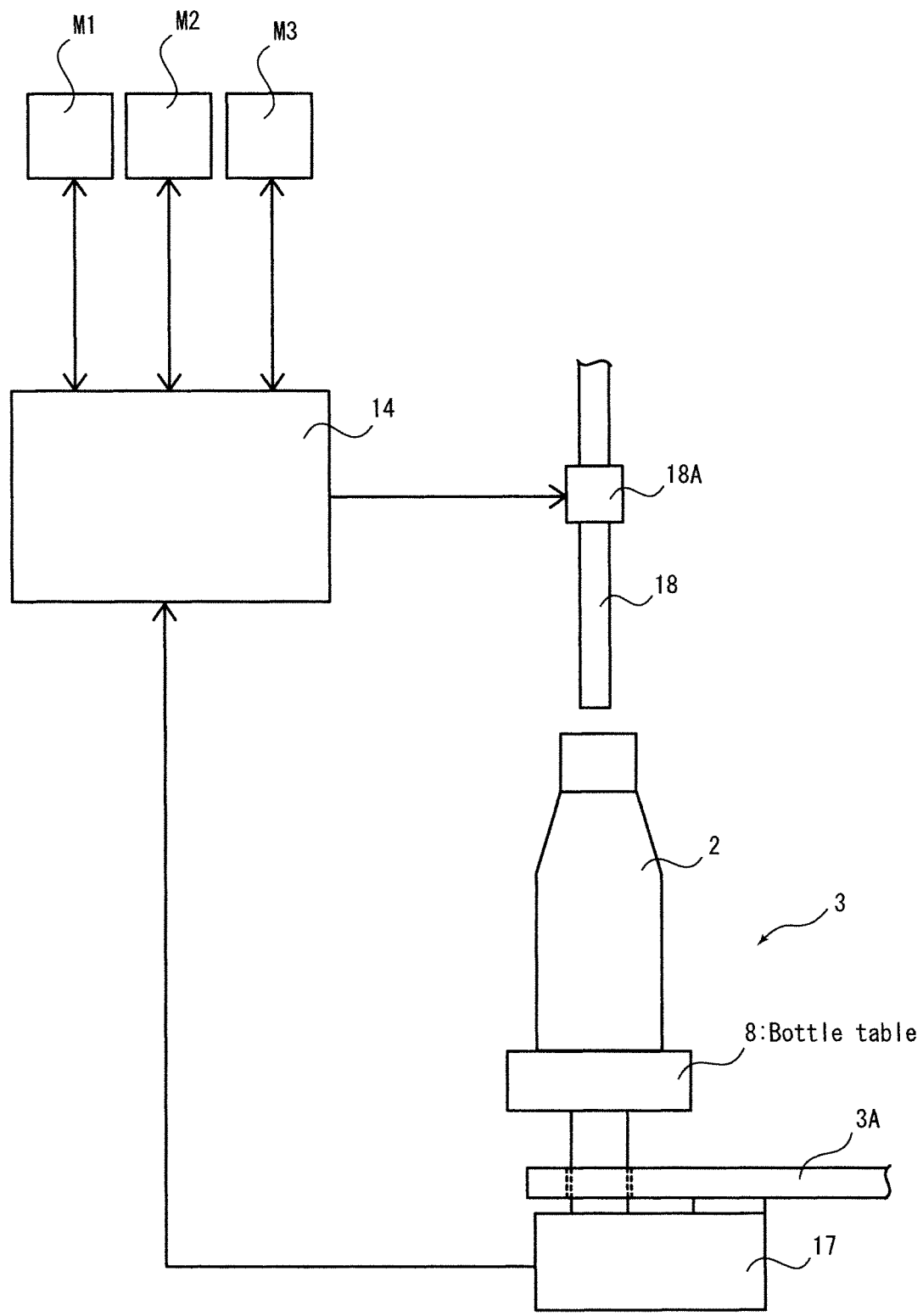
FIG. 4 is a cross-sectional view taken along line IV-IV in FIG. 1.

As illustrated in FIG. 1 and FIG. 4, the weighing and filling apparatus 3 as the container processing apparatus includes a rotor 3A rotationally driven by a servomotor M1, and load cells 17 (weight scales) are disposed at equal pitches in a circumferential direction on an outer peripheral portion of the rotor 3A. The bottle tables 8 as container supporting devices supporting the containers 2 are attached to the respective load cells 17, and filling nozzles 18 are provided above the corresponding bottle table 8. In the present embodiment, 32 bottle tables 8 from first to 32-th bottle tables 8 and 32 filling nozzles 18 from first to 32-th filling nozzles 18 are disposed at equal pitches in the circumferential direction of the rotor 3A even though some of them are only illustrated in FIG. 1.

Operation of the servomotor M1 and on-off valves 18A of the filling nozzles 18 are controlled by the control apparatus 14. Weights measured by the load cells 17 are constantly sent to the control apparatus 14.

When the containers 2 are supplied from the container supply apparatus 11 to the respective bottle tables 8 of the weighing and filling apparatus 3 at a supply position A through the supply wheel 5 while the servomotor M1 is operated and the rotor 3A is rotated in the direction of the arrow, the control apparatus 14 opens the on-off valves 18A of the filling nozzles 18 above the bottle tables 8. As a result, filling of the containers 2 with the filling liquid is started. After filling of the containers 2 with the filling liquid is started, weights of the containers 2 are sent from the load cells 17 to the control apparatus 14. When the measured weights of the load cells 17 match predetermined weights, the control apparatus 14 closes the on-off valves 18A. As a result, each of the containers 2 is filled with the predetermined weight of filling liquid.

The containers 2 filled with the filling liquid by the weighing and filling apparatus 3 are then delivered to the capper 4 from the bottle tables 8 through the rotating intermediate wheel 6, and the upper end openings of the containers 2 are capped by the capper 4. Thereafter, the containers 2 are discharged onto the discharge conveyer 13 through the discharge wheel 12, and are conveyed downstream.

Driving shafts of the supply wheel 5, the rotor 3A of the weighing and filling apparatus 3, the intermediate wheel 6, the capper 4, and the discharge wheel 12 operate in conjunction with one another, and are configured to rotate in directions indicated by the respective arrows in synchronization with one another when the control apparatus 14 drives the servomotor M1.

A plurality of pockets 5A (container holding portions) are provided at pitches which are the same as the pitches of the adjacent bottle tables 8 of the weighing and filling apparatus 3, in the circumferential direction on an outer peripheral portion of the supply wheel 5, even though some of them are only illustrated in FIG. 1. During rotation of the weighing and filling apparatus 3 and the supply wheels 5 in the directions indicated by the arrows, the containers 2 are delivered from the container supply apparatus 11 to the respective pockets 5A at a delivery position B, and are held in the respective pockets 5A. Thereafter, the containers 2 are transferred to the supply position A with rotation of the supply wheel 5, and are supplied to the respective bottle tables 8 of the weighing and filling apparatus 3.

The present embodiment is characterized in that, in a case where it is determined that normal processing is difficult due to occurrence of a defect on any of the load cells 17, the on-off valves 18A, and the like of the weighing and filling apparatus 3, no container 2 is supplied from the container supply apparatus 11 to a specific bottle table 8 corresponding to the load cell 17 or the on-off valve 18A on which the defect occurs, and the containers 2 are successively supplied to the other bottle tables 8.

As illustrated in FIG. 1, the container supply apparatus 11 includes the supply conveyer 7 that conveys a large number of containers 2 from an unillustrated upstream position to the delivery position B and then to the supply wheel 5 through a linear conveyance path, and a screw 19 is rotatably disposed on an upper side by the supply conveyer 7 and aligns the containers 2 on the supply conveyer 7 at predetermined intervals in straight line.

The containers 2 to be processed are PET containers each made of a synthetic resin, and the containers 2 that mutually move back and forth are supplied in a dense state to the linear supply conveyer 7. Operation of a motor serving as a driving source of the supply conveyer 7 is controlled by the control apparatus 14. The control apparatus 14 makes the supply conveyer 7 run at a predetermined speed in the direction of the arrow through the unillustrated motor.

Figure 2:
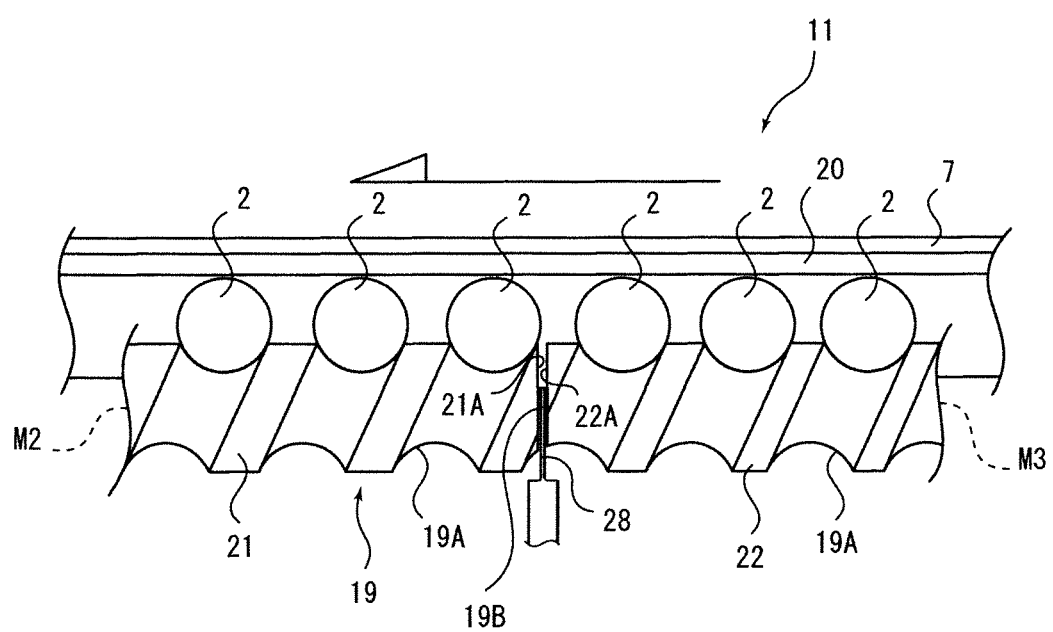
FIG. 2 is an enlarged view of a main part in FIG. 1.
Figure 3:
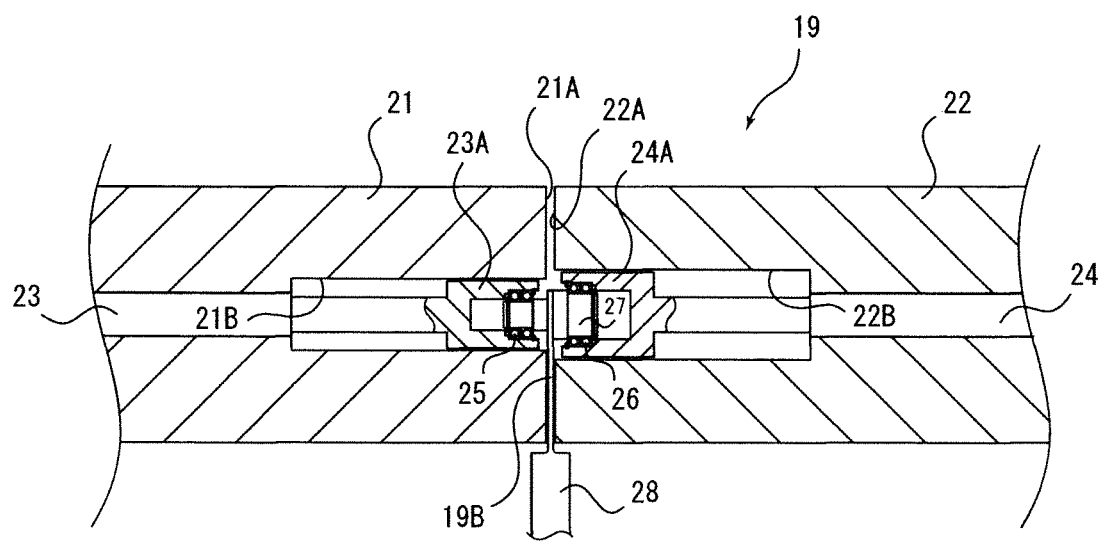
FIG. 3 is a cross-sectional view of a main part in FIG. 2.

As illustrated in FIGS. 1 to 3, the screw 19 is disposed in parallel with a conveyance direction on the conveyance path of the supply conveyer 7. A spiral groove 19A having a semi-circular cross-section is provided on an outer peripheral surface of the screw 19. Further, a plate-like guide member 20 is disposed on the supply conveyer 7 at a height which is the same as the height of the screw 19 and is disposed in parallel with the screw 19.

When the supply conveyer 7 is made to run at the predetermined speed while the screw 19 is stopped, the leading container 2 reaches an upstream end of the screw 19 and is stopped. Further, the subsequent containers 2 sequentially collide with the preceding containers 2 and are stopped. As a result, the containers 2 are accumulated on an upstream of the screw 19 in a dense state. When an unillustrated detection unit detects that a predetermined number of containers 2 are accumulated, the screw 19 is rotated at a predetermined speed, and the containers 2 accumulated on the supply conveyer 7 sequentially are sent into a gap between the guide member 20 and the spiral groove 19A of the screw 19. When body parts of the containers 2 engage with the groove 19A, the adjacent containers 2 are aligned at predetermined pitches in a straight line in the conveyance direction, and are then transferred to the delivery position B on the downstream side. Note that the number of containers 2 conveyed to the downstream side by the screw 19 and the number of containers 2 conveyed by the supply conveyer 7 are set to be substantially equal to each other. Therefore, the number of containers 2 accumulated on the upstream of the screw 19 is hardly changed. The pitches (intervals) of the containers 2 that mutually move back and forth and sequentially separated from each other by engaging with the groove 19A of the screw 19 are equal to the pitches of the adjacent bottle tables 8 of the weighing and filling apparatus 3 and the pitches of the adjacent pockets 5A of the supply wheel 5.

The screw 19 according to the present embodiment includes a downstream screw 21 and an upstream screw 22 that are axially divided into the upstream side and the downstream side in the conveyance direction. The downstream screw 21 is coupled to a servomotor M2 and the upstream screw 22 is coupled to a servomotor M3.

As illustrated in FIG. 2 and FIG. 3, the downstream screw 21 and the upstream screw 22 each have the same outer diameter and the same axial dimension, and rotary shafts 23 and 24 are integrally embedded at axial center positions of the screws 21 and 22, respectively. Further, the above-described spiral groove 19A is provided over outer peripheral portions of the downstream screw 21 and the upstream screw 22. Note that illustration of the groove 19A is omitted in FIG. 3.

End surfaces 21A and 22A at a boundary 19B between the downstream screw 21 and the upstream screw 22 are close to each other while maintaining a slight gap, and respectively include bottomed holes 21B and 22B in the axial direction. An upstream end of the rotary shaft 23 is formed as a cylindrical portion 23A enlarged in diameter, and the cylindrical portion 23A is housed inside the bottomed hole 21B. Further, a downstream end of the rotary shaft 24 is formed as a cylindrical portion 24A enlarged in diameter, and the cylindrical portion 24A is housed inside the bottomed hole 22B. A bearing 25 having a small diameter is attached to the cylindrical portion 23A, and a bearing 26 having a large diameter is attached to the cylindrical portion 24A.

Further, a small-diameter portion of a shaft member 27 formed in a stepped columnar shape is fitted to an inner race of the bearing 25, and a large-diameter portion of the shaft member 27 is fitted to an inner race of the bearing 26.

A front end of a thin plate-like supporting member 28 is coupled to a center part in the axial direction of the shaft member 27. The supporting member 28 extends outward through the gap at the boundary 19B between the end surfaces 21A and 22A of the above-described screws 21 and 22, and an unillustrated end part of the supporting member 28 is coupled to a fixing frame. As a result, the screws 21 and 22 are horizontally supported, and are individually rotatable on the same axis.

As described above, the downstream end of the downstream screw 21 is coupled to the servomotor M2, and the upstream end of the upstream screw 22 is coupled to the servomotor M3. The operation of the servomotors M2 and M3 are controlled by the control apparatus 14. The control apparatus 14 individually rotates the servomotors M2 and M3 at predetermined speeds, to thereby switch between a normal operation and a thinned-out operation, as described in detail below.

In a case where the filling nozzles 18 and the load cells 17 of the weighing and filling apparatus 3 all have no abnormality, and the containers 2 are supplied to all of the bottle tables 8 and are filled with the filling liquid while the rotor 3A of the weighing and filling apparatus 3 is rotated, namely, in a case of the normal operation, the screw 19 is operated as follows.

The control apparatus 14 operates the servomotors M1 to M3 to control the rotation speeds of the rotor 3A, the downstream screw 21, and the upstream screw 22 such that the weighing and filling apparatus 3 and the screw 19 are equal in processing capacity to each other. For example, in a case where the weighing and filling apparatus 3 is rotated at a rotation speed at which 320 of the containers 2 are processed per minute, the downstream screw 21 and the upstream screw 22 are also rotated in the same direction in synchronization with each other at a rotation speed at which 320 containers 2 are delivered to the delivery position B per minute.

Each of the containers 2, after having reached the upstream end of the screw 19 on the supply conveyer 7, engages with the spiral groove 19A of the screw 19 and is conveyed to the downstream side, and the subsequent containers 2 also sequentially engage with the groove 19A and are conveyed to the downstream side.

In a process in which the containers 2 are conveyed while engaging with the groove 19A of the screw 19, the intervals of the adjacent containers 2 are expanded so as to be equal to the pitches of the adjacent bottle tables 8 of the weighing and filling apparatus 3 and the pitches of the adjacent pockets 5A of the supply wheel 5. Thereafter, when the containers 2 reach the delivery position B of the supply wheel 5, the containers 2 are housed in the respective pockets 5A of the rotating supply wheel 5, are transferred in that state, and are supplied to the respective bottle tables 8 of the rotating weighing and filling apparatus 3 at the supply position A (see FIG. 1 and FIG. 2). The containers 2 on the respective bottle tables 8 are each filled with the predetermined weight of filling liquid by the filling nozzles 18 and the load cells 17 with rotation of the rotor 3A. Thereafter, the containers 2 are delivered to the capper 4 through the intermediate wheel 6 and are capped, and are then discharged to the discharge conveyer 13 through the discharge wheel 12.

In a conveyance process by the discharge conveyer 13, an unillustrated reject mechanism that rejects a defective container is provided. When a defective container 2, after filling, is discharged from the discharge conveyer 13 by the reject mechanism, information on the reject is sent to the control apparatus 14.

When the control apparatus 14 receives the information on the reject from the reject mechanism, and recognizes that the containers 2 processed by a specific filling nozzle 18 of the weighing and filling apparatus 3 or the load cell 17 corresponding thereto have been successively rejected, the control apparatus 14 determines that the on-off valve 18A of the specific filling nozzle 18 or the load cell 17 corresponding thereto is defective, and switches the supply operation of the containers 2 by the container supply apparatus 11 from the above-described normal operation to the thinned-out operation.

For example, in a case where it is determined that, among the first to 32-th filling nozzles 18 provided in the weighing and filling apparatus 3, the third filling nozzle 18 or the load cell 17 corresponding thereto is defective, the control apparatus 14 first stops filling of the filling liquid by the third filling nozzle 18, and switches the operation to the thinned-out operation so as to not supply a container 2 to the third bottle table 8 corresponding to the third filling nozzle 18.

In the present embodiment, during the above-described normal operation, the containers 2 on the supply conveyer 7 are stopped once by an unillustrated stopper at the upstream position of the screw 19, and the containers 2 located on the downstream side of the stopper in that state are all supplied to the bottle tables 8 of the weighing and filling apparatus 3 by the container supply apparatus 11 through the supply wheel 5. Further, the processing of filling the containers 2 with the filling liquid by the filling nozzles 18 and the capping processing by the capper 4 are performed, and all of the containers 2 located on the downstream side of the unillustrated stopper are discharged to the discharge conveyer 13. Thereafter, the operation is switched to the thinned-out operation.

First, the control apparatus 14 is set so as to supply no container 2 to the above-described third bottle table 8, and then the thinned-out operation is started.

When the thinned-out operation is started, the control apparatus 14 retracts the unillustrated stopper that stops the containers 2 on the upstream side of the screw 19. As a result, the containers 2 on the supply conveyer 7 are accumulated sequentially from the leading container 2 having reached the upstream end of the screw 19. When the predetermined number of containers 2 are accumulated, the control apparatus 14 drives the servomotors M1, M2, and M3 to start supply of the containers 2 to the weighing and filling apparatus 3.

The operation of the downstream screw 21 and the upstream screw 22 during the thinned-out operation is described with reference to FIG. 5.

When supply of the containers 2 to the weighing and filling apparatus 3 is started, the control apparatus 14 recognizes that the container 2 denoted by X2 in FIG. 5 is the container 2 to be supplied to the second bottle table 8 positioned just before the third bottle table 8 (that is determined to require no supply), as well as recognizes that the subsequent container 2 denoted by X3 is a specific container 2 to be supplied not to the third bottle table 8 but to the fourth bottle table 8 positioned just behind the third bottle table 8.

Figure 5A:
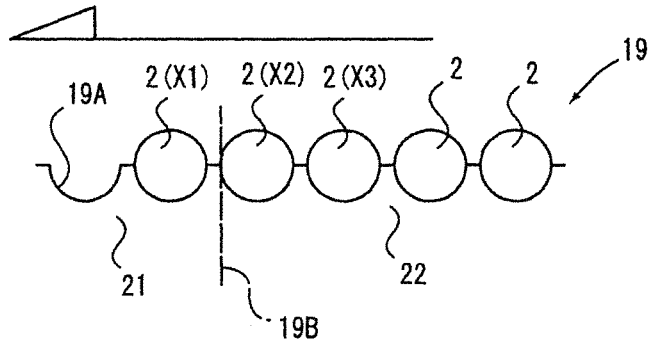
FIGS. 5A to 5D are operation step diagrams in a case where no container is supplied to a specific bottle table by a screw illustrated in FIG. 2.
Figure 5B:
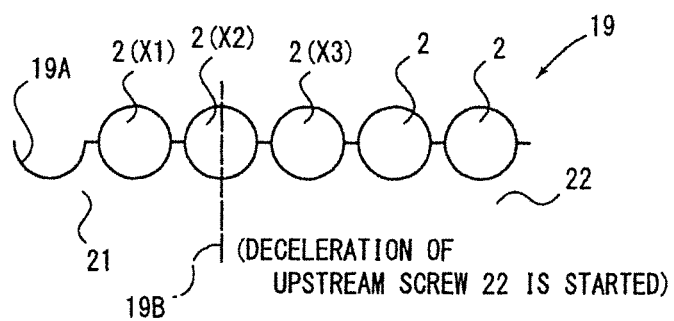

In the state where the downstream screw 21 and the upstream screw 22 are rotated at the same speed in synchronization with each other (see FIG. 5A), at timing when a center of the conveyed container 2 denoted by X2 reaches the boundary 19B between the screws 21 and 22, deceleration of the upstream screw 22 is started while the speed of the downstream screw 21 is maintained (FIG. 5B).

When the upstream screw 22 is decelerated, the position of the groove 19A of the downstream screw 21 and the position of the groove 19A of the upstream screw 22 are shifted from each other at the boundary 19B. Therefore, if the upstream screw 22 is decelerated before the center of the container 2 denoted by X2 reaches the boundary 19B, the container 2 denoted by X2 cannot be successfully transferred to the downstream screw 21, and may be bitten into or caught in the boundary 19B. Therefore, the upstream screw 22 is preferably decelerated at or after the time when the center of the container 2 denoted by X2 reaches the boundary 19B.

Figure 5C:
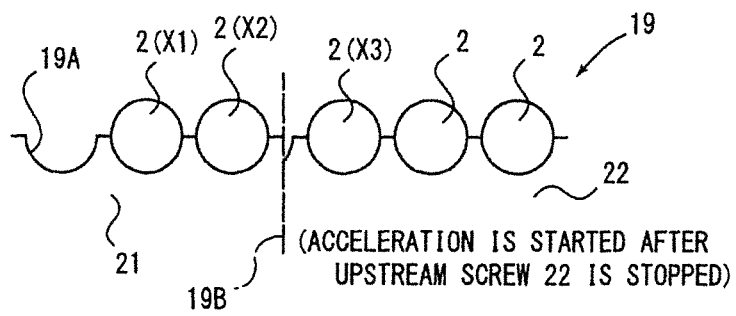

Thereafter, the upstream screw 22 is stopped. After a predetermined time has elapsed from the time when the upstream screw 22 is stopped, the upstream screw 22 is rotationally driven again and acceleration thereof is started. While the upstream screw 22 is decelerated, stopped, and accelerated in the above-described manner, the rotation speed of the downstream screw 21 is maintained, and the container 2 denoted by X2 and the container 2 denoted by X1 at an adjacent downstream position are conveyed to the downstream side as they are. As a result, an interval between the container 2 denoted by X2 and the specific container 2 denoted by X3 is expanded (FIG. 5C).

Figure 5D:
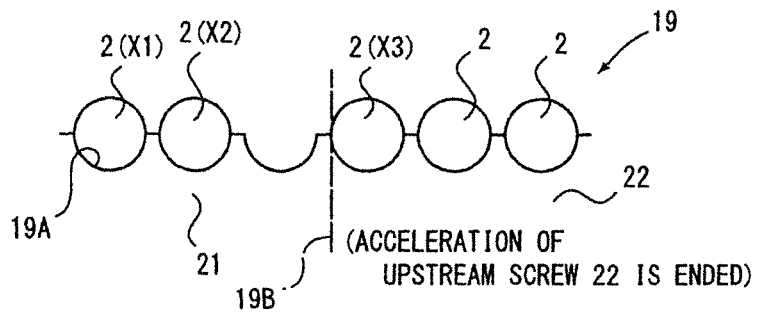

At a timing when a front end of the specific container 2 denoted by X3 reaches the boundary 19B, acceleration of the upstream screw 22 is ended, and the upstream screw 22 is controlled so as to rotate at the speed same as the speed of the downstream screw 21. As a result, the spiral groove 19A returns to a continuous state as in the state of FIG. 5A, and the interval between the container 2 denoted by X2 and the specific container 2 denoted by X3 is expanded to two pitches (FIG. 5D).

After the container 2 denoted by X2 is delivered to the pocket 5A of the supply wheel 5 corresponding to the second bottle table at the delivery position B in FIG. 1, even when the pocket 5A corresponding to the third bottle table positioned upstream of the pocket 5A corresponding to the second bottle table reaches the delivery position B, the specific container 2 denoted by X3 is not conveyed. Therefore, the pocket 5A corresponding to the third bottle table is delivered to the supply position A in an empty state. Thereafter, when the pocket 5A corresponding to the fourth bottle table positioned upstream of the pocket 5A corresponding to the third bottle table reaches the delivery position B, the specific container 2 denoted by X3 is conveyed by the groove 19A of the downstream screw 21, and is delivered to the pocket 5A corresponding to the fourth bottle table.

The containers 2, after the specific container 2 denoted by X3, are conveyed by the downstream screw 21 and the upstream screw 22 rotated at the same speed. Therefore, the containers 2 are conveyed in a state where the interval between each of the containers 2 and the corresponding preceding container 2 is one pitch, and the containers 2 are sequentially delivered to the pockets 5A of the supply wheel and are supplied to the fifth bottle table and the subsequent bottle tables.

Note that the third bottle table 8 to which no container 2 is supplied reaches the supply position A once while the rotor 3A of the weighing and filling apparatus 3 is rotated once. Therefore, during the thinned-out operation, the upstream screw 22 is decelerated, stopped, and accelerated once so as not to supply the specific container 2 to the third bottle table 8 while the rotor 3A is rotated once.

As described above, in the present embodiment, in the case where no container 2 is supplied to the specific bottle table 8 of the weighing and filling apparatus 3, the operation of the container supply apparatus 11 is switched from the normal operation to the thinned-out operation. Only the supply of the container 2 to the specific bottle table 8 is stopped and the supply of the containers 2 to the other bottle tables 8 is continued by decelerating, stopping, and accelerating the upstream screw 22 at least once while the weighing and filling apparatus 3 is rotated once.

Accordingly, in the case where a defect occurs on any of the filling nozzles 18 of the weighing and filling apparatus 3 and the like, no container 2 is supplied to an unnecessary bottle table 8. This makes it possible to prevent the containers 2 from being unnecessarily damaged, and to prevent the containers 2 from being rejected from the discharge conveyer 13.

Note that, in the above-described embodiment, the weighing and filling apparatus 3 is the container processing apparatus. However, the container processing apparatus may be a filling apparatus other than the weighing and filling apparatus, or may be a processing apparatus such as a capper and a labeler other than the filling apparatus.

Further, in the above-described embodiment, the case where no container 2 is supplied to one bottle table 8 of the weighing and filling apparatus 3 is described as the thinned-out operation. However, the thinned-out operation in which a plurality of successive bottle tables 8, for example, for two or three successive bottle tables 8 are thinned out is performable, and the thinned-out operation in which a plurality of nonsuccessive bottle tables 8, for example, for the third, the seventh, and the 30-th bottle tables 8 are thinned out is also performable.

Further, in the above-described embodiment, during the thinned-out operation, the upstream screw 22 is decelerated, stopped, and accelerated. However, the upstream screw 22 may not be stopped and may be accelerated immediately after deceleration, depending on conditions such as processing capacity of the container processing apparatus and a size of each of the containers.

Further, in a case where the containers 2 are not self-supporting, the containers 2 may be conveyed while being housed in stands.

What is claimed is:

1. A container processing system, comprising:
a rotor having an outer peripheral portion;
a plurality of container supporting devices disposed on the rotor at predetermined pitches along the outer peripheral portion of the rotor, the container supporting devices being configured to support containers;
a plurality of processing mechanisms provided on the rotor corresponding to the respective container supporting devices, the processing mechanisms being configured to perform predetermined processing operations on the containers supported by the container supporting devices;
a container supply apparatus configured to supply the containers to the container supporting devices on the rotor; and
a control apparatus configured to control operation of the processing mechanisms and the container supply apparatus,
wherein:
the container supply apparatus includes a supply conveyer and a screw, the supply conveyer being configured to convey the containers, the screw being configured to convey the containers on the supply conveyer in a conveyance direction from an upstream side of the conveyor to a downstream side of the conveyor by causing a spiral groove provided on an outer peripheral surface of the screw to engage with the containers;
the screw includes a downstream screw and an upstream screw, the downstream screw being disposed adjacent the downstream side of the conveyor and being rotated by a first driving mechanism, the upstream screw being disposed adjacent the upstream side of the conveyor and being rotated by a second driving mechanism, operation of the first driving mechanism and the second driving mechanism being controlled by the control apparatus;
in a case where the containers are supplied to all of the container supporting devices of the container processing apparatus, while the rotor is rotated, the downstream screw and the upstream screw are rotated at the same speed, and the containers are conveyed to the downstream side of the conveyor by being caused to engage with a spiral groove provided on outer peripheral surfaces of both the downstream screw and the upstream screw, the spiral grooves of the upstream screw and the downstream screw together forming the spiral groove of the screw;
in a case where no container is supplied to a specific container supporting device of the container processing apparatus, while the rotor is rotated once, an interval between first and second successive containers engaging with the spiral groove is expanded by decreasing and then increasing the speed of the upstream screw at least once relative to the downstream screw, to supply no container to the specific container supporting device; and
in the case where no container is supplied to the specific container supporting device of the container processing apparatus, the interval between the first and second successive containers is expanded by starting deceleration of the upstream screw in a state where the first container is positioned at a boundary between the upstream screw and the downstream screw, and then ending acceleration of the upstream screw before the second container reaches the boundary, the second container being located upstream of the first container with respect to the conveyance direction.

* * * * *